United States Patent [19]
Street et al.

[11] Patent Number: 5,920,401
[45] Date of Patent: Jul. 6, 1999

[54] COMPACT DOCUMENT IMAGER

[75] Inventors: Robert A. Street, Palo Alto, Calif.; Ichiro Fujieda, Kanagawa, Japan; Steven Edward Nelson, Mountain View; Leonard Eugene Fennell, Half Moon Bay, both of Calif.

[73] Assignee: Xerox Corporation, Stamford, Conn.

[21] Appl. No.: 08/570,193

[22] Filed: Dec. 11, 1995

Related U.S. Application Data

[63] Continuation of application No. 08/174,913, Dec. 29, 1993, abandoned.

[51] Int. Cl.$^6$ ............................... H04N 1/00; H04N 1/04
[52] U.S. Cl. ................... 358/400; 358/471; 358/473; 358/482; 358/513; 345/87; 345/44; 345/104
[58] Field of Search ..................................... 358/473, 475, 358/476, 471, 400, 482, 513; 178/18, 19, 20; 378/98.2; 345/87, 44, 179, 76, 104, 182, 7–9; 359/72

[56] References Cited

U.S. PATENT DOCUMENTS

| | | | |
|---|---|---|---|
| 4,149,197 | 4/1979 | Kos | 358/471 |
| 4,660,095 | 4/1987 | Cannella | 358/513 |
| 4,839,634 | 6/1989 | More | 340/712 |
| 5,026,980 | 6/1991 | Ondris | 250/208.1 |
| 5,060,071 | 10/1991 | Ino | 358/213.11 |
| 5,153,386 | 10/1992 | Siefer | 178/18 |
| 5,177,328 | 1/1993 | Ito | 178/18 |
| 5,218,459 | 6/1993 | Parulski | 358/451 |
| 5,243,149 | 9/1993 | Comerford | 178/18 |
| 5,243,332 | 9/1993 | Jacobson | 345/44 |
| 5,256,868 | 10/1993 | Kaplan | 250/208.1 |
| 5,278,673 | 1/1994 | Scapa | 358/473 |
| 5,430,462 | 7/1995 | Katagiri et al. | 345/105 |

OTHER PUBLICATIONS

"Liquid Crystal Displays"—Don Lancaster.
D. Armitage—"Liquid Crystal Voltage Controlled Retardation Display" Jul. 1, 1980.
S. Sherr—"A Liquid Crystal Bar Graph Meter".
M. Goscianski—Optical Characteristics of Twisted Nematic Liquid Crystals Dec. 1977.
M. Matsumura et al., (IEEE Electron Device Letters), "Amorphous–Silicon Image Sensor IC", vol. EDL–1, No. 9, Sep. 1980, pp. 182–184.
R.A. Street et al., (Material Research Society Symposium Proceedings), "Amorphous Silicon Sensor Arrays For Radiation Imaging", vol. 192, 1990, pp. 441–452.
M.J. Powell et al., (Material Research Society Symposium Proceedings), "Amorphous Silicon Image Sensor Arrays", vol. 258, 1992, pp. 1127–1137.

*Primary Examiner*—Thomas D. Lee
*Attorney, Agent, or Firm*—Oliff & Berridge, PLC

[57] ABSTRACT

The compact document imager and display apparatus has a two-dimensional image sensor array, a flat panel display such as a liquid crystal display (LCD), and processing electronics. An illumination source can be added to illuminate the document on the sensor array and to provide backlight for the LCD. Color imaging may be achieved by providing three sequential illumination pulses of appropriate colors. A document is placed in close contact with the sensor array. The document is illuminated and an electronic image is captured and stored in the processing electronics. The captured image can be displayed on the LCD by the processing electronics. The document, such as a single sheet of paper or a transparency, can be illuminated by the room light to perform image capture. The compact document imager can be used as a facsimile machines by providing telephone connections. Documents can be scanned using the sensor array and sent to other devices. Documents can be received from other sources and displayed on the LCD. A light-pen can be used to generate handwritten documents or highlight portions of documents. An X-ray imaging device is created by placing a thin phosphor sheet in contact with the sensor array. The x-ray imaging device is placed over an object illuminated by X-rays and the image produced by the glowing phosphorous is stored and displayed by the LCD.

25 Claims, 6 Drawing Sheets

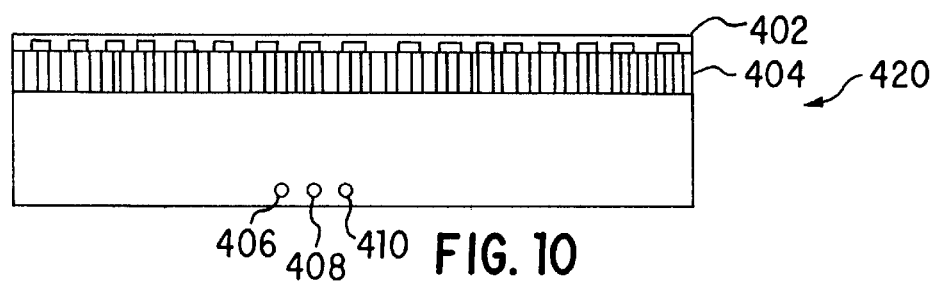
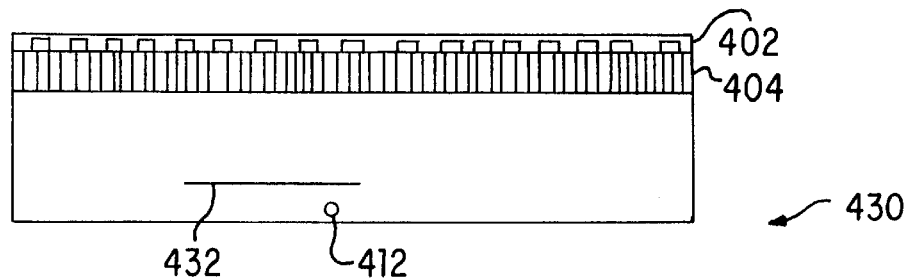
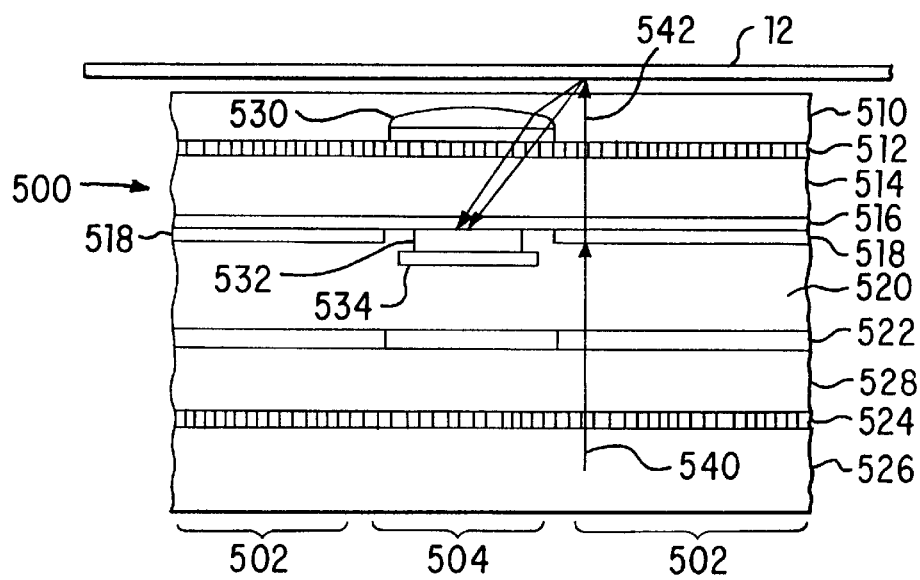

COMPACT DOCUMENT IMAGER

This is a Continuation fo application Ser. No. 08/174,913 filed Dec. 29, 1993, now abandoned.

BACKGROUND OF THE INVENTION

1. Field of the Invention

This invention relates to improvements in image capture and display devices. More particularly, this invention pertains to solid state arrays used for light imaging and displaying of documents.

2. Description of the Related Art

Three separate devices are required (a) to accept hand-drawings, (b) to acquire graphic information from a document, and (c) to display images. A typical contact-type document scanner uses a linear scanner that requires mechanical motions and an illumination source, which reduces the advantage of compactness. There are several techniques for inputting hand drawings, such as capacitive or optical position sensors, but these are not capable of also accepting an image from a document.

Current color flat bed scanners work in one of two modes. The first mode is to mechanically line scan an image in three colors. The second mode is to view the document with a CCD camera in three colors. Both of these systems operate with perfect color registration using filtered illumination; but often the perfect registration is abandoned because of its slowness. A mechanical line scanner can be particularly slow when three color passes are used (HP IMAGEPROc). A one pass system uses three rows of line sensors with color separation filters, and a white illuminate. Registration is still not perfect, and more importantly, the scan speed for one page is still limited to several seconds for a mechanical scan platform.

Addressable two-dimensional image sensor arrays made from amorphous silicon were conceived by M. Matsumura et al (IEEE Electron Device Letters, vol. EDL-1, page 182, 1980) and were demonstrated by Street et al (Material Research Society Symposium Proceedings, vol. 192, page 441, 1990). The use of these arrays for contact imaging was reported by Powell et al (Material Research Society Symposium Proceedings, vol. 258, page 1127, 1992).

Street et al (Material Research Society Symposium Proceedings, vol. 192, page 441, 1990) describe the use of large area amorphous silicon arrays together with a suitable phosphor for x-ray imaging. Present x-ray detectors result in an image on film or on a cathode ray tube display. In either case, the image cannot easily be viewed where it is formed.

SUMMARY OF THE INVENTION

It is an object of the invention to provide a compact monochrome or color document image input device.

It is another object of the invention to provide an integrated portable document image input and display, which can also be used as a compact facsimile machine.

It is another object of the invention to provide an integrated input/output device as part of a personal computer or workstation, for pointing, writing and document input in a workstation, or to view transparencies.

It is another object of the invention to provide a compact device to enlarge documents for reading by sight impaired people.

It is another object of the invention to provide an x-ray image sensor for direct real time viewing of objects. Interpretation of x-ray images is improved by directly viewing the patient or object where the image is formed.

It is another object of the invention to provide a pointing device that can detect 3-dimensional positions and rotations.

The compact document imager comprises a two-dimensional image sensor array, a flat panel display such as a liquid crystal display (LCD), an illumination source and processing electronics. One design stacks the image sensor array over the liquid crystal display (LCD). A second design builds the image sensor array on one of the two glass substrates sandwiching the liquid crystal. The contact type image sensor array has a resolution of 200–400 spots per inch. The sensor array is fabricated from hydrogenated amorphous silicon in a structure in which each pixel contains a light sensor and a thin film transistor formed on a substrate.

A document is placed in close contact with the sensor array. The document is illuminated and an electronic image is captured and stored in the processing electronics. The captured image can be displayed on the LCD by the processing electronics. The illumination source is used to provide backlighting for the LCD as well as the illuminating the document through the image sensor array. If the document is a transparency, image capture may alternatively be achieved by illuminating through the document, rather than through the array. If the images are on slides, the images can be projected onto the surface of the sensor array and captured.

The processing electronics serve to retrieve the image from the sensor array, to output the image to the LCD, to provide various image processing functions, and to communicate with other devices through a telephone line or computer network.

The compact document imager can be used in facsimile machines. A telephone connection connects the processing electronics to a telephone line. Documents can be scanned using the sensor array and sent to other devices. The facsimile machine can also receive data and display it on the LCD.

The compact document imager can also be incorporated into a personal computer or workstation, with the functions of image capture and display. In either mode of operation, image processing electronics allows for such features as image enlargement and character recognition. In addition, image input can be performed with a light pen. A handwritten document can be generated or portions of a document can be highlighted.

The compact document imager can act as a sophisticated pointing device which can detect three-dimensional positions and rotations.

An X-ray imaging device uses a thin phosphor sheet placed in contact with the sensor array of the compact document imager. The x-ray imaging device can be placed over an object illuminated by x-rays. The sensor array captures the image of the glowing phosphor and the LCD can display the image.

The sensor array is capable of capturing an image in as little as 30–100 msec. Therefore, the compact document imager can perform high speed color imaging of more than 100 pages per minute. Color imaging may be achieved by providing three sequential illumination pulses of red, green and blue light. Therefore, the advantages of the device are the rapid image storage, absolute color registration, compact size of the complete scanner, and scanning without mechanical motion.

BRIEF DESCRIPTION OF THE DRAWINGS

For a better understanding of the invention and further features thereof, reference is made to the following detailed description of the invention to be read in connection with the accompanying drawings, wherein:

FIGS. 8–11 show compact color document scanners that use different color illuminates;

FIGS. 12–13 show compact color document scanners that use LCD filters;

DETAILED DESCRIPTION OF THE PREFERRED EMBODIMENTS

While this invention is described in some detail herein with specific reference to illustrated embodiments, it is to be understood that there is no intent to be limited to these embodiments. On the contrary, the aim is to cover all modifications, alternatives and equivalents falling within the spirit and scope of the invention as defined by the claims.

A large area two-dimensional sensor array, an LCD unit and processing electronics are the basic components of the compact document imager and display apparatus. These components can be arranged in a variety of different ways to achieve the same goal: to duplicate a document electronically; to input hand-written drawings; and to display an electronically stored image. The entire device can be made with a thickness of as little as half an inch.

Figure 1:
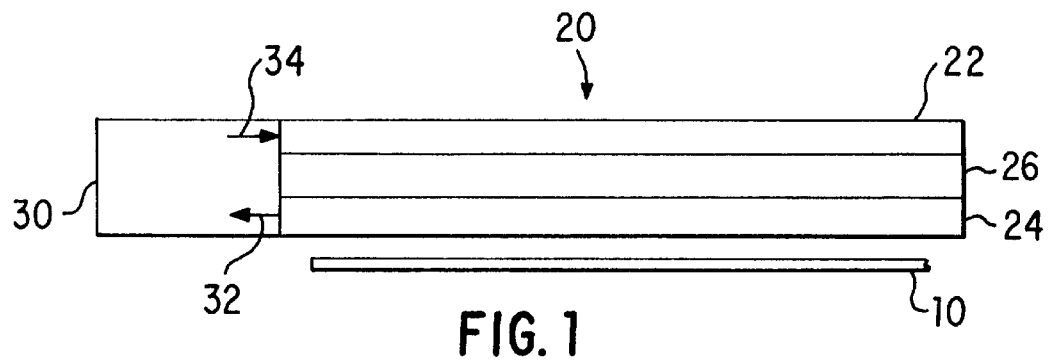
FIG. 1 is a side view showing the components of the invention for the structure in which the image sensor array and the LCD are on opposite sides of the illuminator.

Referring to FIG. 1, a side view of the compact document imager and display apparatus 20 (hereinafter called Compact Imager) is shown. This first preferred embodiment has the image sensor array and the LCD on opposite sides of the illuminator. The document 10 is placed underneath the compact imager 20 and close to the surface of the image sensor array. The sensor array 24 scans the images on the document 10. The document 10 is illuminated by the illuminator 26, which also serves as the back-light for the LCD 22. After the document has been illuminated and scanned, the electronic image is sent to the processing electronics 30 via control line 32. The image can be stored, sent to another device, or displayed on the LCD 22 via control line 34. An operator can view the electronically processed document when displayed by the LCD 22.

The processing electronics can arrange for the whole image to be displayed on the LCD, or for part of the image to be displayed in a larger format. Thus, the compact imager can enlarge documents for reading by sight impaired people.

Figure 2:
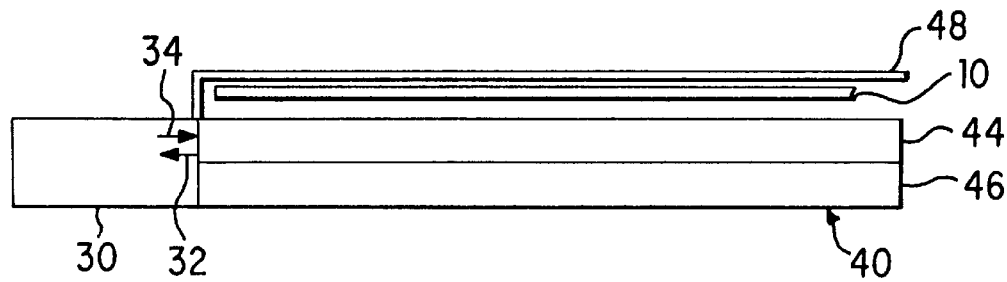
FIG. 2 is a side view showing the components of the invention for the structure in which the image sensor array and the LCD are on the same side of the illuminator.

Referring to FIG. 2, a second preferred embodiment for a compact imager is shown. The image sensor array and the LCD are on the same side of the illuminator. The document 10 is placed on top of the compact imager 40. The LCD/sensor array 44 scans the images on the document 10 using light from the illuminator 46. Similar to the first preferred embodiment, the generated electronic image is processed in the processing electronics 30 via control lines 32. The image can be displayed on the LCD/sensor array 44 via control lines 34. The compact imager has an optional, removable, opaque cover 48 used to eliminate the ambient illumination when necessary.

When the surrounding room light is bright, the illuminator may be eliminated, particularly in the first preferred embodiment. Ambient illumination passes through the LCD and the sensor array to illuminate the document. This greatly reduces the power consumption of the compact imager. In the second preferred embodiment, a single-sided document can be scanned using the room light incident on the back of the document, but a book or other opaque document, or a two-sided document will require the illuminator. Therefore, a switch may be used to manually control the operation of illuminator, especially when a battery pack is being used.

Instead of using a document, a light pen may be used. With the light pen, the sensor array will detect the light and display a handwritten document. A light pen is available and easily implemented with the compact imager of the second preferred embodiment. The handwritten document can be saved or transferred to another unit for printing on a printer.

Figure 3:
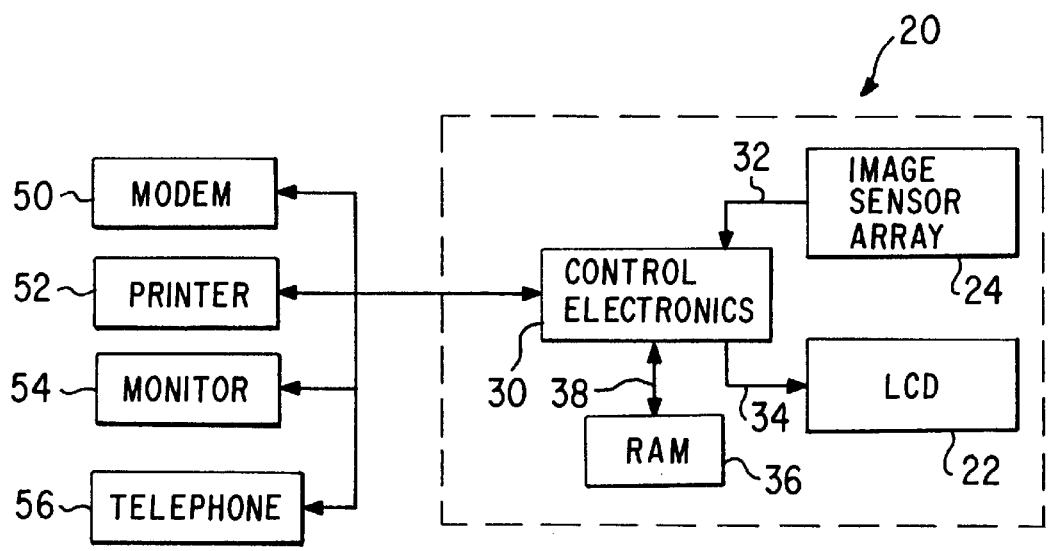
FIG. 3 is a block diagram of the compact document imager and peripheral hardware.

Referring to FIG. 3, a control diagram is shown for a compact imager 20. The control electronics 30 receive image data from the sensor array 24 via control line 32. The electronic image can be stored in and read from the RAM 36 via control line 38. The electronic image can be displayed on the LCD 22 via control line 34. The electronic image can also be sent to other devices such as a modem 50, a printer 52, a monitor 54 for display, a telephone 56 for facsimile transmission, or other similar devices. The control electronics 30 can also receive electronic images from the modem 50, monitor 54, or telephone 56 to be displayed on the LCD 22.

The processing electronics can be located below the illuminator in the second preferred embodiment. The combination of the illuminator and processor already exists as a back-light module for an LCD. The LCD/image sensor array can then be attached to the illuminator. Tape Automated Bonding (TAP) technology provides efficient connection methods between these devices.

In the first preferred embodiment, the sensor array 24 can have the structure described by Street et al (Material Research Society Symposium Proceedings, vol. 192, page 441, 1990). Each pixel contains a photosensitive element, preferably amorphous semiconductor photodiodes, although any thin film photosensor could perform this function. The readout is controlled by a thin film transistor (TFT) at each pixel. The TFT is made from amorphous or polycrystalline silicon. Sensor arrays with diodes to perform the readout are also possible. The two-dimensional silicon photodiode arrays with a silicon TFT read out scheme are fabricated on glass substrate to allow light from the illuminator 26 to pass through. Metal gate control lines and output lines on the sensor array allow an electronic image to be sent to the external electronics. A light shield is located below the photosensitive element to inhibit the direct light from the illuminator 26 from triggering the photosensitive element.

Figure 4:
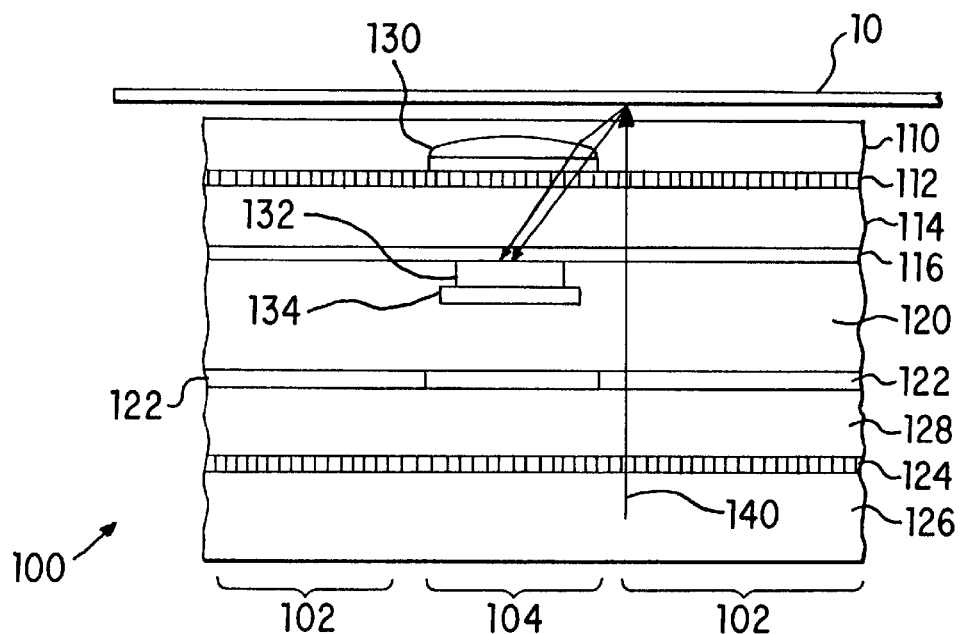
FIG. 4 is a side view showing the combination of the sensor array and LCD.

Referring to FIG. 4, a detailed diagram shows the sensor array, LCD and illuminator in a compact imager 100 of the second preferred embodiment. Only one sensor pixel 104 and two LCD pixels 102 are shown. It is assumed that the same structure extends in both the X and Y directions to cover a page size area. The two-dimensional sensor array is designed to allow the majority of the light from the illuminator 126 to pass through the LCD and be observed by the operator. For example, each photosensitive area is about 20×20 microns in size compared to typically 150×150 micron area for each LCD pixel. A resolution of approximately 100–300 spots per inch is adequate for the compact imager.

The separation of approximately two millimeters between the LCD and the document allows sufficient divergence of the light to give uniform illumination. The top polarizer for the LCD can be placed either below the sensor or above the sensor. If it is below the sensor, it requires separate LCD cover plate and sensor array substrate. If it is above the sensor, the sensor array substrate and LCD cover plate can be the same.

FIG. 4 shows one design for the second preferred embodiment of the invention. The illuminator 126, which is a standard type illuminator widely used in backlit LCDs and portable computers, forms the bottom section of the compact imager 100. The top protective layer 110, protects the elements of the imager from scratches. The document 10 is placed on top of the top protective layer 110.

Each sensor pixel 104 has a microlens 130 for converging the light rays to a photo-sensitive element 132, which generates signals in response to light rays. The photo-sensitive elements are a combination of amorphous semiconductor photodiodes and thin film transistors. The two-dimensional silicon photodiode arrays with a silicon TFT read out scheme are fabricated on glass substrates. Metal gate control lines and output lines allow an electronic image to be sent to the external electronics. A light shield 134 is located below the photo-sensitive element 132 to inhibit the direct light from the illuminator 126 from triggering the photosensitive element 132.

The liquid crystals 120 are sandwiched between two clear-glass substrate plates: a top substrate plate 114 and a bottom substrate plate 128. The liquid crystal layer is typically less than 10 microns thick. Each LCD pixel has two transparent electrodes. A top transparent electrode 116 is attached to the bottom of the top substrate plate 114 and a bottom transparent electrode 122 is attached to the top of the bottom substrate plate 128. The electrodes create a weak electric voltage that aligns the liquid crystals. An active matrix LCD may be made with amorphous silicon TFTs at each pixel.

A bottom polarizer 124 is attached to the bottom of the bottom substrate plate 128 and a top polarizer 112 is attached to the top of the top substrate plate 114. Each polarizer passes only a specific vibrational direction of polarized light. Usually the polarizers are positioned so that the direction of the light plane is perpendicular to each other, i.e., the bottom polarizer passes light rays vibrating in the x-plane and the top polarizer passes light rays vibrating in the y-plane. When no voltage potential exists between the electrodes, the crystals form a twisted pattern that twists the plane of vibration of light by 90 degrees. This aligns the polarized light to pass through the top polarizer. When a weak electric current is applied to the electrodes, the crystals line up so that the polarized light is not twisted. Thus, the top polarizer will block the light.

The compact imager 100 reads a document in the following manner. Light rays 140, which vibrate in planes at random angles, are generated in the illuminator 126. The bottom polarizer 124 passes light rays in only one plane, e.g., the x-plane. The electrodes 116 and 122 are de-energized, therefore the light ray 140 is twisted in the y-plane to pass through the top polarizer 112. Assuming that the section of the document 10 has no print, i.e., a white space, the light ray 140 is reflected off the document 10 toward the microlens 130. The light ray 140 scattered by the document are focused onto the photosensitive element 132, which sends a signal to the processing electronics (not shown.)

If the illuminator is turned off, the light passing through a single page document is enough to activate the photosensitive elements. A light-pen with echo-back feature can be used to activate specific photosensitive elements. This can be used to highlight specific areas of a document or generate a hand-written document.

The compact imager 100 displays a document in the following manner. The processing electronics (not shown) energizes the appropriate top and bottom electrodes to create a sufficient voltage to rotate the liquid crystal molecules. The polarized light is blocked, and therefore, a dark pixel is formed. If the electrodes are not energized, then the polarized light is twisted and passes through both polarizers to represent a light pixel. This is the standard means of operating the LCD.

If the illuminator is inactive, the ambient light from the room can also be polarized and used to display stored documents. A light scattering surface (not shown) would be placed below the bottom polarizer. Light rays from the room are polarized by the top polarizer and pass through the liquid crystals to the bottom polarizer. The polarized light rays are reflected by the scattering surface and again pass through the bottom and top polarizers. Similarly, if the electrodes are energized, then the light rays are blocked and the pixel looks dark.

Figure 5:
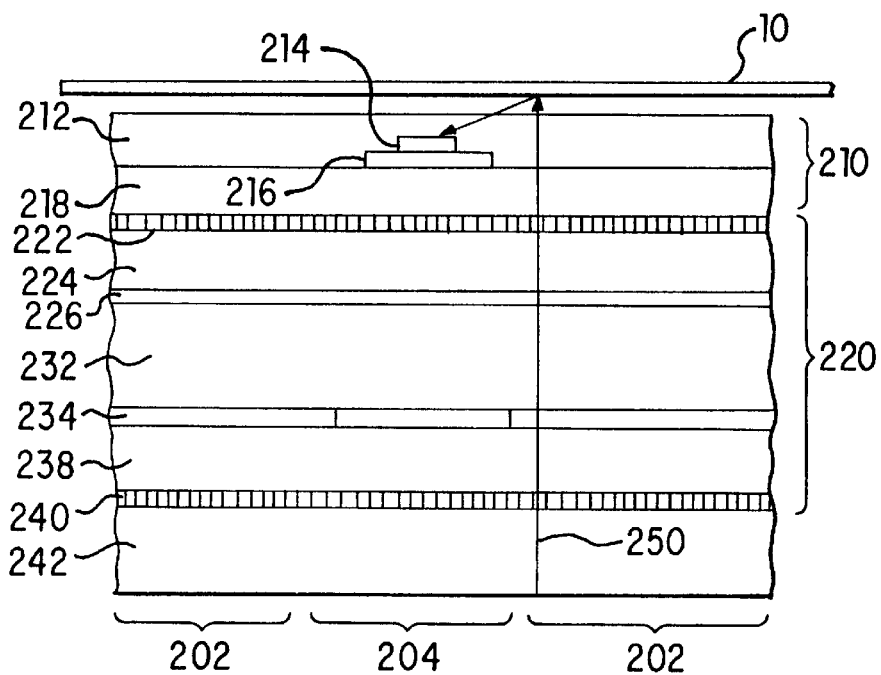
FIG. 5 is a side view showing an alternative combination of the sensor array and LCD.

FIG. 5 shows a third preferred embodiment. This image sensor array and LCD form a compact imager 200 that can be used in the second preferred embodiment described above. This embodiment has an extra substrate, but no microlenses, because the document is in close proximity to the surface of the sensor array. The two-dimensional sensor 210 and the LCD 220 can be made separately and stacked together as shown in FIG. 5. Similar to the previous embodiment, only one sensor pixel 204 and two LCD pixels 202 are shown; but the structure extends in both the X and Y directions to cover a page size area.

The illuminator 242 forms the bottom section of the compact imager 200. The top protective layer 212, protects the elements of the imager from scratches. The document 10 is placed on top of the top protective layer 212. Microlenses are not needed if the protective layer is no thicker than about half the dimension of the pixel.

Each sensor pixel 204 has a photo-sensitive element 214, which generates a signal in response to light rays. A light shield 216 is located below the photosensitive element 214 to inhibit the direct light passing through the LCD. The light shield 216 is attached to the clear-glass substrate plate 218 to complete the sensor array 210.

In the LCD 220, the liquid crystals 232 are sandwiched between a top clear-glass substrate plate 224 and a bottom clear-glass substrate plate 238. The liquid crystals are less than 10 microns thick. Each LCD pixel 202 uses a top transparent electrode 226 and a bottom transparent electrode 234. Similar to the previous embodiment, the electrodes cause the liquid crystals to align due to the applied voltage. A bottom polarizer 242 and a top polarizer 222 are attached to the bottom and top substrates, respectively. Similar to the previous embodiment, each polarizer passes only a specific vibrational direction of polarized light.

The compact imager 200 reads and displays document images in the same manner as the previous embodiment.

The compact imager 200 reads a document 10 by first producing light rays 250 in the illuminator 242. The bottom polarizer 240 passes light rays in only one plane, e.g., the x-plane. The electrodes 226 and 232 are de-energized, therefore the light ray 250 is twisted in the y-plane to pass through the top polarizer 222. Assuming that the section of the document 10 has no print, i.e., a white space, the light ray 250 is reflected off the document 10 toward the photosensitive element 214, which sends a signal to the processing electronics (not shown.)

The compact imager 200 also displays a document by energizing the appropriate top and bottom electrodes to create a voltage across the liquid crystals. A dark pixel is formed because the polarized light is blocked. If the electrodes are not energized, then the polarized light is twisted and passes through both polarizers to represent a light pixel. The ambient room light can be polarized and used to display stored documents. A scattering surface (not shown) would be placed below the bottom polarizer.

Similar to the previous embodiment, light passing through a single page document is enough to activate the photosensitive elements. Also, a light-pen can be used to activate specific photosensitive elements. The advantage of this embodiment is that the sensor array and the LCD can be manufactured separately and bonded together.

The two-dimensional array is very sensitive in the previous embodiments. The array can easily capture an image in low intensity room light. Ambient illumination is typically 1–10 pWatts/cm$^2$ in the visible part of the spectrum absorbed by Si:H. This corresponds to $10^{13}$–$10^{14}$ photons/second/cm$^2$. The sensor array can easily detect $10^7$ photons/pixel. Therefore, an image read time of about 1 second is adequate. Thus a sensor size of no more than 10×10 microns is needed, and the sensor array can be a small fraction of the pixel size. The high sensitivity simplifies the readout electronics.

Figure 6:
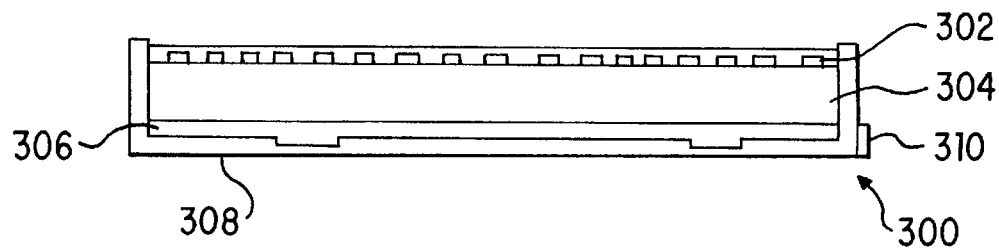
FIG. 6 shows a note pad document scanner.

A fourth preferred embodiment is an apparatus for scanning documents, therefore, the LCD is eliminated. A note pad document imager is shown in FIG. 6. It has the same size and dimension as a thick note pad, i.e. 9"×12"×1". The advantage of the note pad document imager over the prior art is the extreme compactness because there are no scanners with moving heads or copy cameras. The note pad document imager is basically used like a contact scanner.

The note pad document imager 300 has a two-dimensional sensor array 302, which is manufactured by forming the amorphous semiconductor photodiodes and thin film transistors on the transparent substrate. The LCD type illuminator 304 illuminates the document by passing light rays through the substrate and gaps in the two-dimensional array 302. A thin readout circuit board (PCB) 306 and a thin molded cover 308 are mounted on the back of the flat illuminator 304. Thin, flexible surface mounted connectors and components 310 are mounted on the thin molded cover 308 to interface with other devices.

The two-dimensional sensor array scans the documents in a contact mode with back illumination. Because of the uniformly spaced transparent gaps, they can be illuminated from behind and used as contact scanners. The ratio of the sensor area to the total surface area and a distance between the sensor and a document can be optimized to allow sufficient illumination to a document and enough scattered light to the sensor. If the sensor length is one-quarter of the pixel pitch (pixel size), dithering within a pixel pitch can increase spatial relation. Current technology allows a 9×11.5 inch imager to have a pitch down to about 0.003 inch (75 microns). These imagers can scan text, line drawings and photographic documents.

For direct contact imaging, the document is slightly spaced away from the two-dimensional array for illumination. The document must be placed within about half the dimension of a pixel or less from the sensor array for the best resolution. One design uses a thin sheet of glass bonded to the surface of the array. Another method is to coat the array surface with an extremely hard transparent material such as silicon carbide, silicon nitride or silicon oxide by a chemical vapor deposition (CVD) process. The advantage of the silicon carbide is that it provides an extremely hard permanent surface over the array. Unfortunately, the silicon carbide layer is not always thick enough for complete protection from abrasion. Therefore, a thin sheet of glass may need to be used to increase the distance between the sensor array and the document.

The illuminator 304 is a standard type illuminator widely used in backlit liquid crystal displays and portable computers. The thickness of the sensor array 302, the PCB 306 and the molded plastic cover 308 is around 0.25 inches. Therefore, most of the thickness of the note pad document imager 300 is due to the illuminator 304. The illuminator 304 selected may be based on low power consumption or reduction in thickness.

A readout PCB 306 is a conventional multi-layer Fiber Reinforced Plastic (RFP) system with surface mount components to keep the support electronics very thin. The molded plastic cover 308 uses standard RFP or other molded construction that allows a high strength, thin cover. As an additional improvement it could be molded on the inside to match the shape of the components on the readout PCB. This allows additional strength and thinner packaging. Also, an opaque, top cover can be added to protect the sensor array and assist in keeping room light from interfering with the sensor array during imaging.

The note pad document imager can be used to read single sided documents with illumination provided by the room light passing through the document. Even weak room light illumination is sufficient to input the data with exposure time of less than a second. The illuminator could be used as an additional light source or simply turned off to conserve power. Use of room light is limited to only certain thin documents or transparencies. If the document is either two-sided or thick, i.e., a book, then the illuminator 304 must be used. When single-page, two-sided documents are used, the opaque cover is recommended to eliminate interference from an image on the second side.

The note pad document imager 300 can be used with a light pen to hand-write a document. To avoid the effect of ambient illumination from the room, the sensitivity of the sensor array can be electronically adjusted by changing the driving conditions. Also, the background image of the ambient light can be subtracted from the light pen's input image.

If only a portion of a document needs to be imaged or stored, a light pen can be used to selectively input interesting parts of a document. The single sheet document is placed on the sensor array. The light pen is projected over the interesting sections of the document. This is especially useful with graphic inputs. The sensor array will detect the light that passes through the document and record the image. This partial image can be output to another device.

Figure 7:
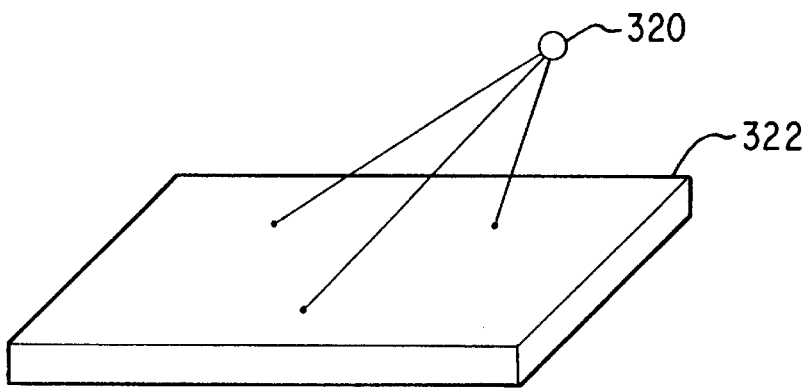
FIG. 7 shows the use of the device to detect three-dimensional position and rotation.

A fifth preferred embodiment uses the two-dimensional sensor array and the light pen to generate a pointing or positioning device. A single light pen, such as a laser, can be used as a single pointer. Referring to FIG. 7, three-dimensional positions and rotations can be detected by using a light pen with three collimated light beams, such as from lasers. For example, if the object 320 has three light beams pointing in different directions toward the surface of the two-dimensional sensor array 322, the positions of the three illuminated points on the sensor array gives the position, height orientation and rotation of the object. Several configurations are possible.

Sixth preferred embodiment through ninth preferred embodiment are two-dimensional color document imagers. A color document is placed on the color imager. The document is illuminated with a sequence of luminance (usually red, green, blue). Information about the document is stored for each illuminate. The documents full color can be determined from the stored information using color separation technology.

Figure 8:
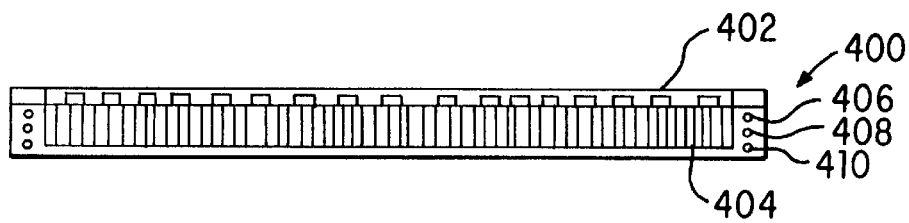
Figure 9:
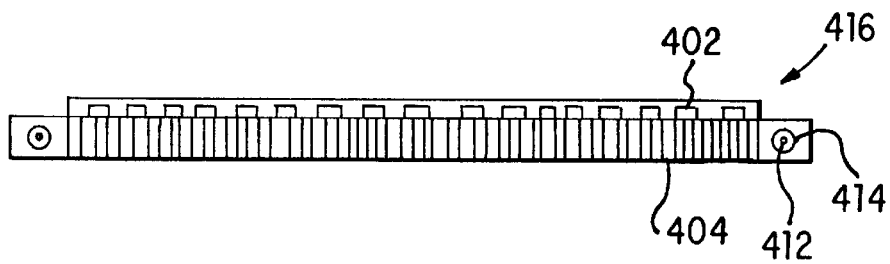

FIGS. 8–11 show four different color imagers. These apparatuses are only examples and other designs are possible. Referring to FIGS. 8 and 9, the sixth and seventh preferred embodiments have color illuminators that are side mounted adjacent to a diffuser. The diffuser diffuses the color light toward the two-dimensional scan array, which has the color document (not shown) above it. The extreme compactness of these color imagers is only achieved because the amorphous semiconductor photodiode and thin film transistor arrays can be formed over very large areas of transparent substrates. This allows them to be used as direct contact sensors with document illumination through the substrate.

In FIG. 8, a color imager 400 has a two-dimensional sensor array 402 located above a diffuser 404. Three color illuminators 406, 408, and 410 are mounted on the side of the diffuser 404. The color illuminators can be mounted on both sides to generate an even diffusion of colored light on all sides of the document. A controller will illuminate each light sequentially and store the output of the sensor array 402.

FIG. 9 shows a color imager 416 with side mounted illuminators, which is the seventh preferred embodiment. A rotatable filter 412 with three color sections surround a white illuminator 414. The two-dimensional imager array 402 is above the diffuser 404. The controller adjusts the position of the rotatable filter 412 and energizes the white illuminator 414 to generate each color.

FIGS. 10 and 11 have illumination from the bottom of the diffuser. FIG. 10 shows a color imager 420 of the eighth preferred embodiment. The two-dimensional sensor array 402 and diffuser 404 are similar to the previous embodiments. Three separate flash illuminators 406, 408 and 410 of the appropriate colors are mounted underneath the diffuser 404. The diffuser is not necessary if the illuminators are mounted far enough away from the scan array; but an increase in the depth of the color imager will result. Only one illuminator is needed for each color. Therefore, the power consumption is reduced.

FIG. 11 shows a color imager 430 of the ninth preferred embodiment. The color imager 430 uses a single white illuminator 412 mounted below a movable filter 432. The controller positions the movable filter 432 to generate the appropriate color to be scanned by the sensor array 402.

Each of these color imagers has the advantage of not requiring a larger pixel density than the non-color document imager. The disadvantage is that it takes three times longer to capture one color image, i.e., each color must be illuminated and stored.

In the alternative, filters could be used on the sensors so that a single illumination is required. This type of color imager has one disadvantage: a larger sensor array is needed because of the three colors to detect. Sensor filter illumination is more advantageous because the sensors have higher responsivity, sensor arrays have excellent registration, and less sensor processing steps are required.

A tenth preferred embodiment is shown in FIG. 12, which is a sensor array with filters. This LCD/color image sensor array 500 is incorporated into an apparatus of the second preferred embodiment to make a compact color document imager and display apparatus (hereinafter, compact color imager). FIG. 12 shows a detailed diagram of the sensor array, LCD and illuminator. Similar to the second preferred embodiment, only one sensor pixel 504 and two LCD pixels 502 are shown. It is assumed that the same structure extends in both the X and Y directions to cover a page size area.

The illuminator 526 is a standard type illuminator that forms the bottom section of the compact color imager. The top protective layer 510 protects the elements of the imager from scratches. The color document 12 is placed on top of the top protective layer 510.

Each sensor pixel 504 has a microlens 530 for converging the light rays to a photo-sensitive element 532, which are an array of amorphous semi-conductor photodiodes and thin film transistors. A light shield 534 is located below the photo-sensitive element 532 to inhibit the direct light from the illuminator 526 from triggering the photo-sensitive element 532.

The liquid crystals 520 are sandwiched between two clear-glass substrate plates: a top substrate plate 514 and a bottom substrate plate 528. The liquid crystals are less than 10 microns thick. Each LCD pixel has two transparent electrodes. A top transparent electrode 516 is attached to the bottom of the top substrate plate 514 and a bottom transparent electrode 522 is attached to the top of the bottom substrate plate 528. The electrodes create a voltage that aligns the liquid crystals. A color filter 518 is attached to the bottom of the top transparent electrode 516.

A bottom polarizer 524 is attached to the bottom of the bottom substrate plate 528 and a top polarizer 512 is attached to the top of the top substrate plate 514. Each polarizer passes only a specific vibrational direction of polarized light. Similar to the second preferred embodiment, the polarizers are positioned so that the direction of the light plane is perpendicular to each other.

The compact color imager reads a document in the following manner. White light rays 540, which vibrate in planes at random angles, are generated in the illuminator 526. The bottom polarizer 524 passes the white light rays in only one plane, e.g., the x-plane. The electrodes 516 and 522 are de-energized, therefore the white light ray 540 is twisted in the y-plane to pass through the top polarizer 512. The white light ray 540 is converted to a specific color light ray 542 by passing through the filter 518. If the color document 12 has that color, then the specific color light ray 542 is reflected off the document 12 toward the microlens 530. The photo-sensitive element 532 detects the color light ray and produces a signal sent to the processing electronics (not shown.)

The compact color imager can also display the color document. Similar to the second embodiment, the processing electronics (not shown) energizes the appropriate top and bottom electrodes to create a voltage across the liquid crystal layer. The polarized light is blocked, and therefore, a dark pixel is formed. If the electrodes are not energized, then the polarized light is twisted and passes through both polarizers and the filter to represent a color pixel.

If the illuminator 526 is inactive, the ambient room light can also be polarized and used to display stored documents. A mirrored surface (not shown) would be placed below the bottom polarizer 524. White light rays from the room are polarized by the top polarizer 512 and pass through the filter 518 and liquid crystals 520 to the bottom polarizer 524. The polarized color light rays are reflected by the mirror surface and again pass through the filter and the bottom and top polarizers. Similarly, if the electrodes are energized, then the light rays are blocked and the pixel looks dark.

Figure 13:
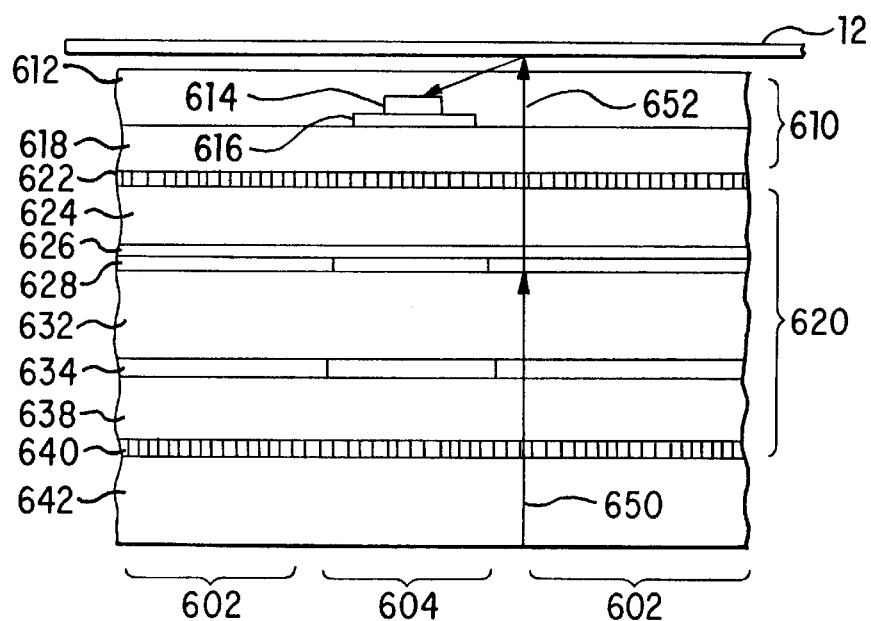

FIG. 13 shows an eleventh preferred embodiment. This image sensor array and LCD form a compact color imager that can also be used in the second preferred embodiment described above. The two-dimensional sensor 610 and the LCD 620 can be made separately and stacked together. Similar to the previous embodiment, only one sensor pixel 604 and two LCD pixels 602 are shown; but the structure extends in both the X and Y directions to cover a page size area.

The illuminator 642 forms the bottom section of the compact color imager. The top protective layer 612, protects the elements of the imager from scratches. The document 12 is placed on top of the top protective layer 612.

Each sensor pixel 604 has a photo-sensitive element 614, which generates a signal in response to light rays. A light shield 616 is located below the photosensitive element 614 to inhibit the direct light passing through the LCD. The light shield 616 is attached to the clear-glass substrate plate 618 to complete the sensor array 610.

In the LCD 620, the liquid crystals 632 are sandwiched between a top clear-glass substrate plate 624 and a bottom clear-glass substrate plate 638. The liquid crystals are less than 10 microns thick. Each LCD pixel 602 uses a top transparent electrode 626 and a bottom transparent electrode 634. A color filter 628 is attached to the top electrode 634. Similar to the previous embodiment, the electrodes cause the liquid crystals to align due to the weak electric currents. A bottom polarizer 640 and a top polarizer 622 are attached to the bottom and top substrates, respectively. Each polarizer passes only a specific vibrational direction of polarized light.

The compact color imager reads and displays document images in the same manner as the previous embodiment. White light rays 650, which vibrate in planes at random angles, are generated in the illuminator 642. When the electrodes 626 and 634 are de-energized, the white light rays 650 pass through the bottom polarizer 640 and are twisted by liquid crystals 632. The filter 628 passes specific colors of light through the top polarizer 622. If the color document 12 has that color, then the specific color light ray 652 is reflected off the document 12 toward the photo-sensitive element 614.

The compact color imager also displays the color document by energizing the appropriate top and bottom electrodes to create voltages to block the polarized light to generate dark pixels. If the electrodes are not energized, then the polarized light is twisted and passes through both polarizers and the filter to represent a color pixel.

If the illuminator 642 is inactive, the ambient room light can also be polarized and used to display stored documents. A scattering surface (not shown) would be placed below the bottom polarizer 640.

A twelfth preferred embodiment is to use a compact document imager and display apparatus in a portable facsimile machine. Conventional facsimile machines comprise a linear imager, a printer and the electronics, which includes the telephone connection. These machines are bulky because an electro mechanical motor is needed to move the paper. Also, the paper needs to be stored for displaying images. Thus, it is difficult to make a lightweight portable facsimile machine. This twelfth preferred embodiment has no moving parts and allows facsimile communication from any phone.

A portable facsimile machine of the twelfth preferred embodiment requires a page size two-dimensional image sensing array described above. The facsimile machine needs about 200 spots per inch for appropriate resolution. The associated control electronics performs the image capture and the image display and configuring the data for telephone connection. A RAM is used to store facsimile images in compressed form for display or transmission. An additional non-volatile memory may also be needed. The stored images can be displayed and read on the LCD.

Figure 14:
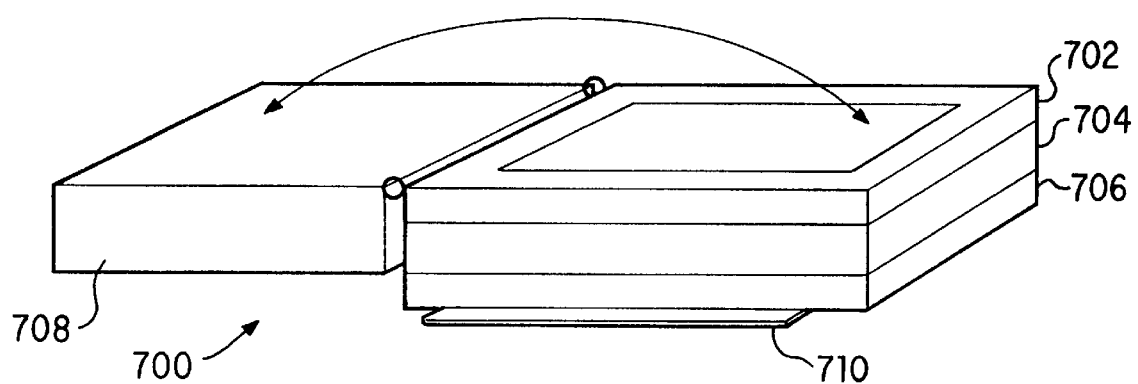
FIGS. 14–15 show two configurations of a facsimile machine that uses a compact document imager.
Figure 15:
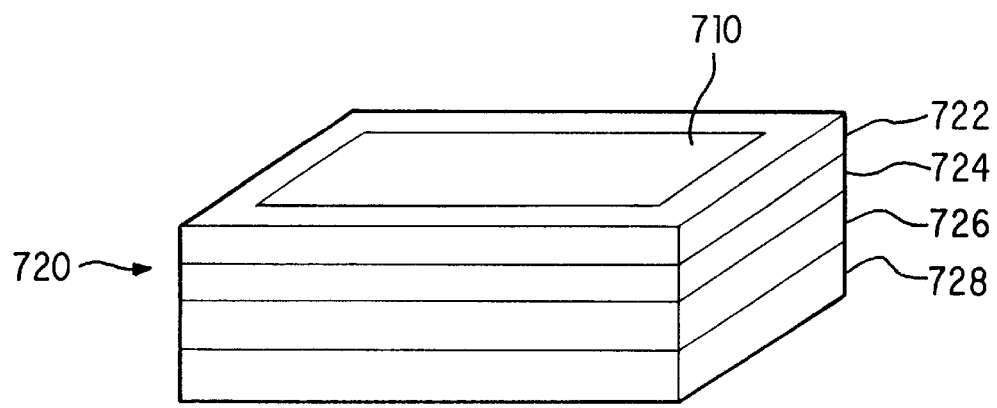

Referring to FIGS. 14 and 15, two portable facsimile machines are shown. Referring to FIG. 14 that shows the twelfth preferred embodiment, a portable facsimile machine 700 uses the compact document imager of the first preferred embodiment. An illuminator 704 is sandwiched between the sensor array 706 and the LCD 702. The portable facsimile machine is placed on top of the document 710 to be scanned. The advantage of this design is that the document is automatically pressed against the image sensor array 706. This provides good resolution and excludes illumination from behind the document. The processing electronics can be put in the cover 708 which protects the LCD surface 702. The cover can be opened to reveal the LCD 702 to display documents scanned or received through the phone transmission. In the alternative, the electronics can be placed around the active device rather than folded out.

Referring to FIG. 15, a portable facsimile machine of the thirteenth preferred embodiment is shown. This portable facsimile machine 720 uses the compact document imager of the second preferred embodiment. The imaging sensor array 722 and the LCD 724 are above the illuminator 726. The processing electronics 728 are located underneath the illuminator 726. The document 710 is placed on top of the imaging sensor array 722 and scanned as previously described. The advantage of this design is that a light pen (not shown) can be used to make a direct input to the sensor array 722, and therefore, facsimile messages can be written directly on the device. The illuminator 726 can be eliminated because the LCD can also be operated using ambient light. Alternatively, the illuminator 726 can be manually disengaged during battery operation. This reduces the need for a large battery pack. A cover (not shown) may be added to protect the device.

A portable PC can be attached to the compact document imager to enable the facsimile option. The personal computer is made into a multi-functional workstation for pointing, writing documents, inputting documents, viewing transparencies, communicating with other devices, etc.

Figure 16:
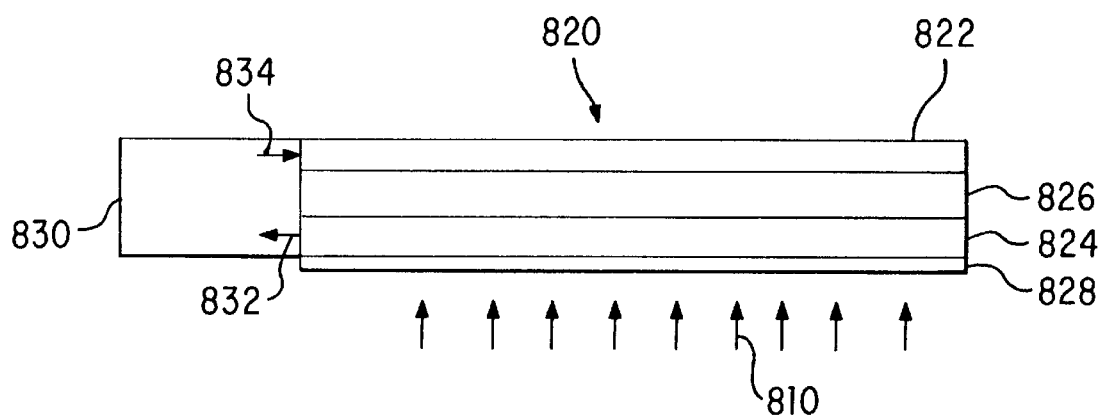
FIG. 16 is an x-ray imaging apparatus.

A fourteenth preferred embodiment used for X-ray imaging is shown in FIG. 16. A compact imager of the first preferred embodiment is modified to include a thin phosphor sheet 828 on the surface of the sensor array 824. Phosphors known to have emission wavelengths suitable for detection by amorphous silicon sensors are $GdO_2S_2$:Tb, or CsI(Tl). The X-ray sensor 820 is placed over an object illuminated by X-rays 810, which causes the phosphorous to glow. The sensors in the sensor array 824 detect the glowing phosphor and store the image in the processing electronics 830 via control line 832. The image can be displayed in real time by using the LCD 822 via the control lines 834. The illuminator 826 is optional because it is only used for displaying the LCD image and not used for the sensor array.

An advantage of this compact device is that the image can be viewed on the LCD in the same position where the image is captured. The compact x-ray imager can therefore be placed next to the patient or object being examined by x-rays, and can be viewed along the line of sight of the x-ray source. This makes it much easier to relate the x-ray image to the object being imaged. Two (or more) separate devices can be used in this way to give x-ray images of a patient or object from two different angles. By viewing the two images at the location where the image is formed, the operator can more easily gain information about the relative position and orientation of the observed features.

Although the invention has been described and illustrated with particularity, it is intended to be illustrated by preferred embodiments. It is understood that the disclosure has been made by way of example only. Numerous changes in the combination and arrangements of the parts, steps and features can be made by those skilled in the art without departing from the spirit and scope of the invention, as hereinafter claimed.

What is claimed is:

1. A compact document imager for inputting and displaying an image comprising:

an image sensor array for sensing light and dark portions of an input image to read the input image, the image sensor array generating electrical signals representing the input image;

a flat panel display for displaying an output image;

an illuminator, sandwiched between the image sensor array and the flat panel display, for illuminating an input image placed adjacent a first side of the image sensor array, light from the input image being sensed by the image sensor array, the illuminator also illuminating the flat panel display to display output images; and a processor for receiving the electrical signals from the image sensor array and for controlling the flat panel display to display an output image on the flat panel display.

2. The compact document imager of claim 1, wherein the processor enlarges the input image before displaying an output image on the display.

3. The compact document imager of claim 1, wherein the image sensor array has a plurality of photosensitive elements for sensing light from the input image.

4. The compact document imager of claim 3, wherein each photosensitive element comprises an amorphous semiconductor photodiode and a thin film transistor.

5. The compact document imager of claim 3, further comprising a plurality of light shields, wherein a light shield is located between each photosensitive element and the illuminator to block direct light from the illuminator.

6. The compact document imager of claim 3, further comprising a plurality of microlenses, wherein a microlens is located between each photosensitive element and the input image to focus scattered light from the input image toward the photosensitive elements.

7. The compact document imager of claim 1, wherein the flat panel display comprises a liquid crystal display, and wherein the liquid crystal display comprises:

liquid crystal material;

a first substrate forming a clear glass plate;

a second substrate forming a clear glass plate, the first and second substrates being spaced apart to hold the liquid crystal material;

a first transparent electrode located on the first substrate;

a second transparent electrode located on the second substrate, the first and second transparent electrodes selectively applying an electrical field across the liquid crystal material;

a first polarizer attached to the first substrate, the first polarizer allowing polarized light to pass therethrough; and a second polarizer attached to the second substrate, the second polarizer allowing polarized light to pass therethrough, wherein application of the electrical field across the liquid crystal material controls the amount of light passing through both the first and second polarizers.

8. The compact document imager of claim 1, wherein the image is a color image, and the compact document imager further comprises a diffuser for diffusing colored light evenly across the color image, the illuminator producing at least one colored light.

9. The compact document imager of claim 8, wherein the diffuser is sandwiched between the illuminator and the image sensor array.

10. The compact document imager of claim 8, wherein the illuminator is mounted adjacent to the diffuser.

11. The compact document imager of claim 1, wherein the image sensor array includes color filters for detecting color images.

12. The compact document imager of claim 1, wherein the image sensor array extends over a first two-dimensional planer area equivalent to a size of the input image, wherein the image sensor array comprises a plurality of photosensitive elements, each of the photosensitive elements extending over a portion of the first planer area, the photosensitive elements blocking only a small portion of light rays passing through the image sensor array, wherein the flat panel display extends over a second two-dimensional area equivalent to the size of the input image, the flat panel display comprising a plurality of pixels, each of the pixels extending over a portion of the second planer area, the second planer area being substantially parallel to and aligned with the first planer area, and wherein each one of the plurality of photosensitive elements is substantially aligned with at least a portion of a corresponding one of the plurality of pixels.

13. The compact document imager of claim 12, wherein the illuminator illuminates an input image adjacent the first side of the image sensor array, the photosensitive elements detecting light reflected from the input image.

14. The compact document imager of claim 13, further comprising a plurality of light shields, wherein a light shield is located between each photosensitive element and the illuminator to block direct light from the illuminator.

15. The compact document imager of claim 12, wherein the processor enlarges or reduces the input image before displaying the output image on the flat panel display.

16. A compact facsimile apparatus, comprising:

an image sensor array for sensing light and dark portions of an input image to read the input image and for generating electrical signals representing the input image;

a flat panel display for displaying an output image;

an illuminator, sandwiched between the image sensor array and the flat panel display, for illuminating an image placed adjacent a first side of the image sensor array, light from the input image being sensed by the image sensor array, the illuminator also illuminating the flat panel display to display output images; and a processor for receiving the electrical signals from the image sensor array, for controlling the flat panel display to display an output image on the flat panel display, for storing images, and for configuring data to send to and to receive from a telephone connection.

17. The compact facsimile apparatus of claim 16, wherein the image sensor array faces downward so that the input image may be read by placing the input image underneath the compact facsimile apparatus, and wherein the flat panel display faces upward for display of output images.

18. The compact facsimile apparatus of claim 16, wherein the image sensor array comprises a plurality of photosensitive elements for sensing light from the image.

19. The compact facsimile apparatus of claim 18, further comprising a plurality of light shields, wherein a light shield is located between each photosensitive element and the illuminator to block direct light from the illuminator.

20. The compact facsimile apparatus of claim 18, further comprising a plurality of microlenses, wherein a microlens is located between each photosensitive element and an input image being read by the image sensor array to focus scattered light from the input image toward the photosensitive elements.

21. The compact facsimile apparatus of claim 16, wherein the flat panel display comprises a liquid crystal display, and wherein the liquid crystal display comprises:

liquid crystal material;

a first substrate forming a clear glass plate;

a second substrate forming a clear glass plate, the first and second substrates being spaced apart by at most 10 microns and containing the liquid crystal material;

a first transparent electrode located on the first substrate;

a second transparent electrode located on the second substrate, the first and second transparent electrodes selectively applying an electrical field across the liquid crystal material;

a first polarizer attached to the first substrate, the first polarizer allowing polarized light to pass therethrough; and a second polarizer attached to the second substrate, the second polarizer allowing polarized light to pass therethrough, wherein application of the electrical field across the liquid crystal material controls the amount of light passing through both the first and second polarizers.

22. The compact facsimile apparatus of claim 16, wherein the input image is a color image, and the compact facsimile apparatus further comprises a diffuser for diffusing input colored light evenly across the color image, the illuminator producing at least one colored light.

23. The compact facsimile apparatus of claim 22, wherein the diffuser is sandwiched between the illuminator and the image sensor array.

24. The compact facsimile apparatus of claim 22, wherein the illuminator is mounted adjacent to the diffuser.

25. The compact facsimile apparatus of claim 16, wherein the image sensor array includes color filters for detecting color images.

* * * * *